US012663656B2

(12) United States Patent
Lin et al.

(10) Patent No.: US 12,663,656 B2
(45) Date of Patent: Jun. 23, 2026

(54) IMAGING DEVICE AND METHOD FOR HOLOGRAPHIC IMAGING OF SAMPLES

(71) Applicant: IMEC VZW, Leuven (BE)

(72) Inventors: Ziduo Lin, Heverlee (BE); Richard Stahl, Rotselaar (BE); Geert Vanmeerbeeck, Keerbergen (BE); Abdulkadir Yurt, Leuven (BE)

(73) Assignee: IMEC VZW, Leuven (BE)

( * ) Notice: Subject to any disclaimer, the term of this patent is extended or adjusted under 35 U.S.C. 154(b) by 528 days.

(21) Appl. No.: 18/071,750

(22) Filed: Nov. 30, 2022

(65) Prior Publication Data

US 2023/0176390 A1 Jun. 8, 2023

(30) Foreign Application Priority Data

Dec. 6, 2021 (EP) ..................................... 21212526

(51) Int. Cl.
 *G02B 27/10* (2006.01)
 *G01N 15/0205* (2024.01)
 (Continued)

(52) U.S. Cl.
 CPC ......... *G02B 27/10* (2013.01); *G01N 15/0205* (2013.01); *G02B 27/0916* (2013.01); (Continued)

(58) Field of Classification Search
 CPC .................. G02B 27/10; G03H 1/0465; G03H 2001/0473; G03H 1/0443 (Continued)

(56) References Cited

U.S. PATENT DOCUMENTS 8,441,638 B2 * 5/2013 Hsieh ....................... C08J 3/203
356/450
2013/0003073 A1 * 1/2013 Yu ......................... G03H 1/0465
356/457

(Continued)

FOREIGN PATENT DOCUMENTS

WO WO-2018/211345 A1 11/2018

OTHER PUBLICATIONS

Grishin, et al., "Lens-free dark-field digital holographic microscopy for 3D tracking of microparticles", SPIEDigitalLibrary.org/conference-proceedings-of-spie.
Verpillat, et al., "Dark-field digital holographic microscopy for 3D-tracking of gold nanoparticles", Optics Express 26044, Dec. 19, 2011, vol. 19, No. 27.

(Continued)

*Primary Examiner* — Audrey Y Chang
(74) *Attorney, Agent, or Firm* — MOSER TABOADA

(57) ABSTRACT

Embodiments of the present disclosure provide an imaging device for holographic imaging of a sample, the imaging device comprising a light source generating a light beam, a beam splitter splitting the light beam into an object beam along an object beam path and a reference beam along a reference beam path, and a detector. The imaging device defines a sample position. The object beam is propagated through the sample position, and the detector is arranged to prevent non-scattered object light, passing through the sample position without being scattered by the sample, from being incident onto the detector. The reference beam is propagated through the sample position, and the detector is arranged so that non-scattered reference light, passing through the sample position without being scattered by the sample, is incident onto the detector. The detector detects an interference pattern formed by scattered object light and the non-scattered reference light.

17 Claims, 7 Drawing Sheets

Figure 1:
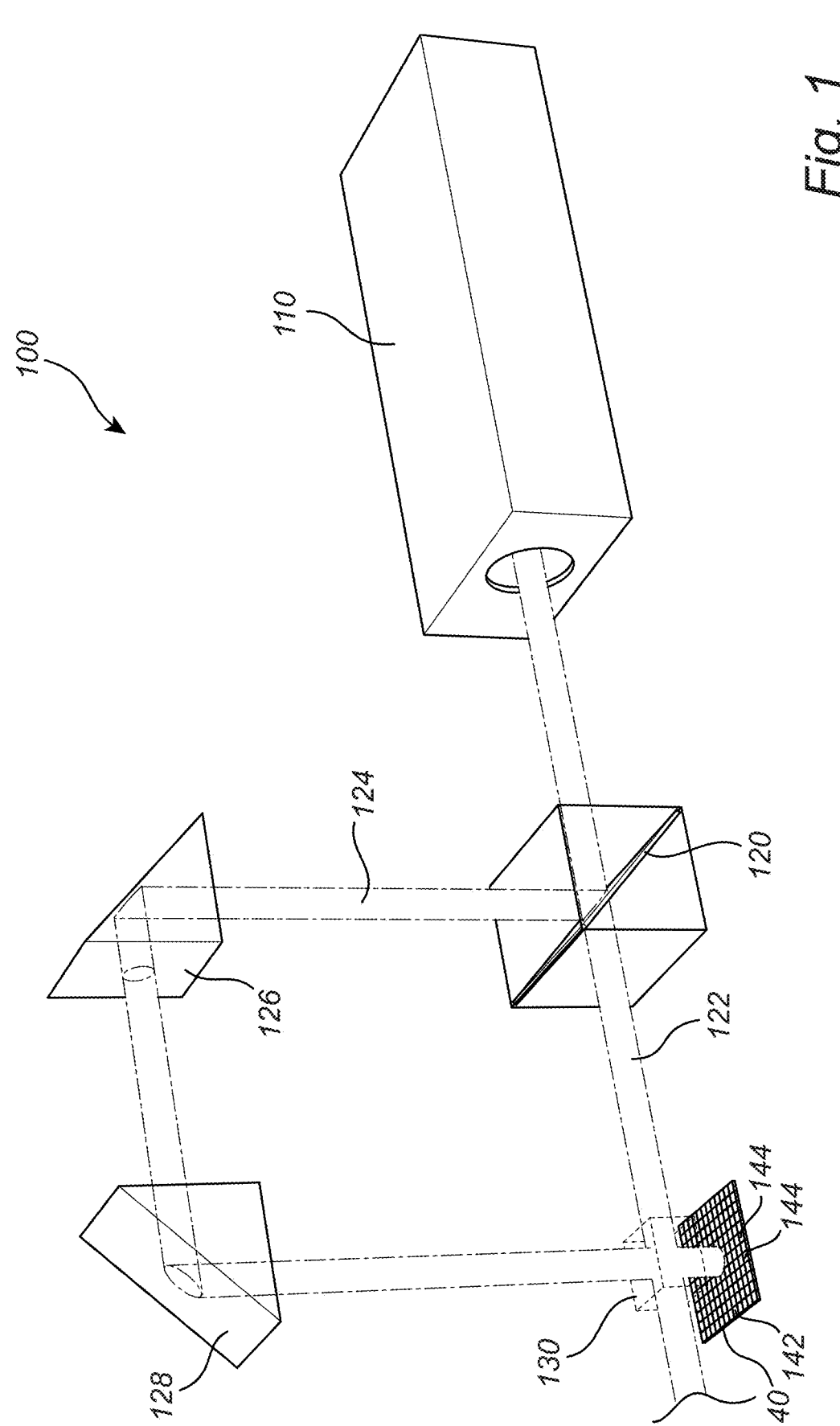

(51) Int. Cl.
G02B 27/09          (2006.01)
G03H 1/04           (2006.01)

(52) U.S. Cl.
CPC ..... G03H 1/0465 (2013.01); G02B 2207/101
(2013.01); G03H 2210/30 (2013.01); G03H
2222/42 (2013.01); G03H 2222/43 (2013.01)

(58) Field of Classification Search
USPC ........................................ 356/450, 457, 482
See application file for complete search history.

(56)                    References Cited

U.S. PATENT DOCUMENTS

| | | | |
|---|---|---|---|
| 2013/0182254 A1 | 7/2013 | Hsieh et al. | |
| 2013/0280752 A1* | 10/2013 | Ozcan ................ | G01B 9/02041 |
| | | | 356/482 |

OTHER PUBLICATIONS

Stahl, et al., "Lens-free digital in-line holographic imaging for wide field-of-view, high resolution and real-time monitoring of complex microscopic objects", Proc. Of SPIE, vol. 8947, 89471F-1.

Deschout, et al., "On-chip light sheet illumination enables diagnostic size and concentration measurements of membrane vesicles in biofluids", Nanoscale, 2014, 6, 1741-1747.

Potcoava, et al., "Lattice Light-Sheet and Self-Interference Incoherent Digital Holography", Digital Holography and 3-D Imaging 2019 © OSA 2019.

Yu, et al., "An edge-lit vol. holographic optical element for an objective turret in a lensless digital holographic microscope", Scientific Reports (2020) 10:14580.

Zhang, et al., "Dark Field Digital Holographic Microscopy Based on Two-lens 360-degree Oblique Illumination", Current Optics and Photonics, vol. 4, No. 3, Jun. 2020.

European Extended Search Report for Application No. 21212526.4-1020 dated May 6, 2022.

* cited by examiner

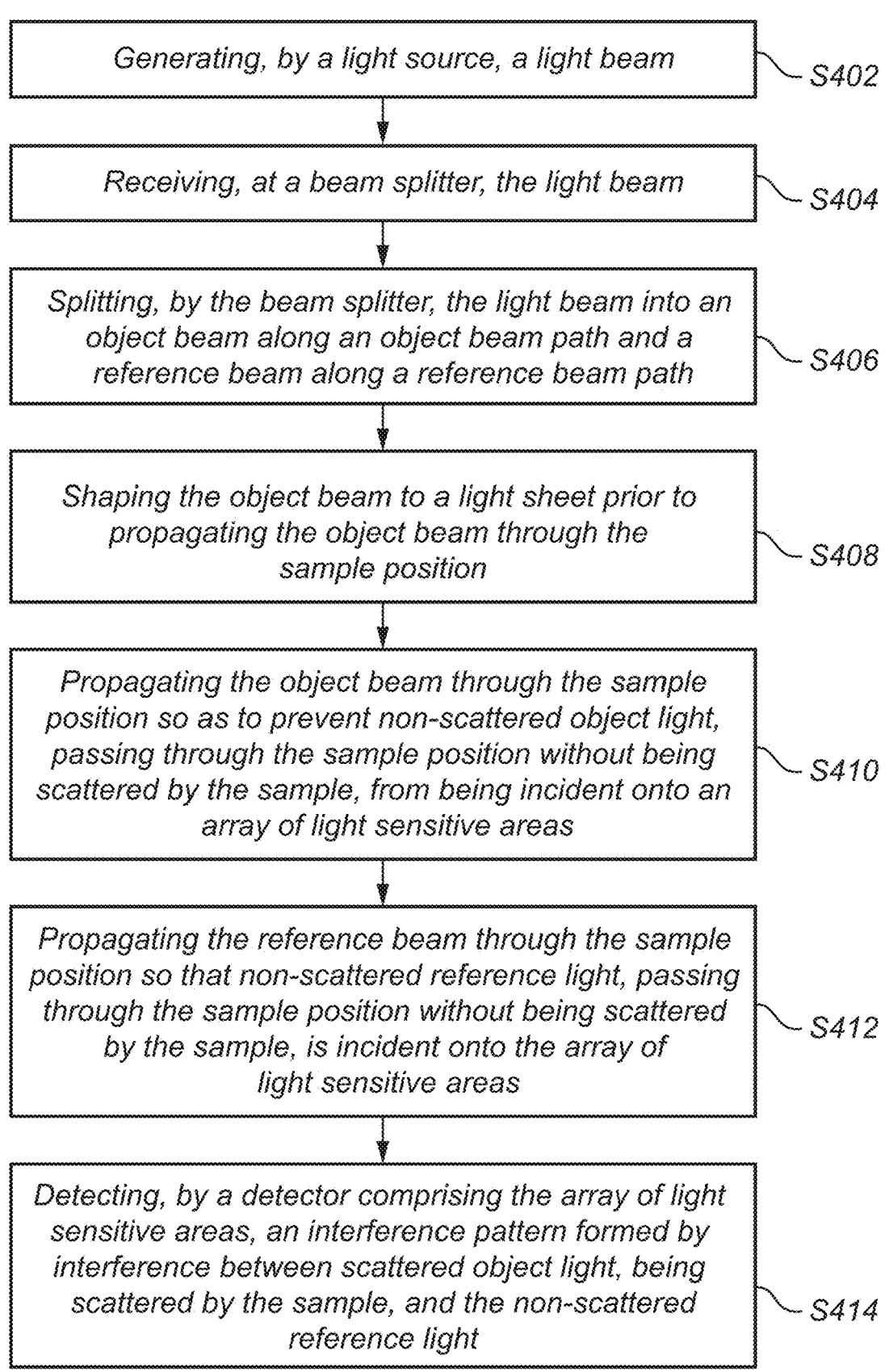

*Generating, by a light source, a light beam* ⟍ S402

*Receiving, at a beam splitter, the light beam* ⟍ S404

*Splitting, by the beam splitter, the light beam into an object beam along an object beam path and a reference beam along a reference beam path* ⟍ S406

Shaping the object beam to a light sheet prior to propagating the object beam through the sample position ⟍ S408

*Propagating the object beam through the sample position so as to prevent non-scattered object light, passing through the sample position without being scattered by the sample, from being incident onto an array of light sensitive areas* ⟍ S410

Propagating the reference beam through the sample position so that non-scattered reference light, passing through the sample position without being scattered by the sample, is incident onto the array of light sensitive areas ⟍ S412

*Detecting, by a detector comprising the array of light sensitive areas, an interference pattern formed by interference between scattered object light, being scattered by the sample, and the non-scattered reference light* ⟍ S414

*Fig. 4*

1

IMAGING DEVICE AND METHOD FOR HOLOGRAPHIC IMAGING OF SAMPLES

CROSS-REFERENCE TO RELATED APPLICATIONS

This application claims benefit of European Patent Application Number EP 21212526.4. filed Dec. 6, 2021 which is herein incorporated by reference in its entirety.

TECHNICAL FIELD

The present inventive concept relates to holographic imaging, and more specifically to an imaging device and a method for holographic imaging of samples. In particular, the present inventive concept relates to holographic imaging of small objects.

BACKGROUND

Digital holography, sometimes referred to as lens-free imaging has emerged as a cost effective, compact imaging method which can acquire images and quantitative data of samples at micrometer scale yet with a large field of view. For many digital holography imaging systems, no dyes or staining of the sample is necessary and low energy light is used. Thus, digital holography imaging may be a non-invasive imaging method.

Digital holography imaging uses scattering of light incident on a sample to acquire spatial information of the sample. Due to the advances within the field of detectors, patterns formed by light based on scattering of light, such as interference patterns between scattered and non-scattered reference light, may now be acquired and computer technology may be used for reconstructing an image of the sample based on a detected pattern.

In-line holographic microscopy is a powerful technique to image partially transparent samples, e.g. comprising cells in a matrix or dispensed in liquids. It is based on an interference pattern of scattered light with non-scattered light passing through the sample being formed and detection of this interference pattern on an image sensor. In-line holographic microscopy can reach a resolution that approximates resolution of standard microscopes, but for a much larger field of view. Further, in-line holographic microscopy allows 3D-reconstruction of an imaged sample.

In-line holographic microscopy works well for particles or structures with dimensions of at least the wavelength of the light used for imaging, say 0.5 μm, where intensity of scattered light is still large enough to result in a measurable interference pattern. For smaller structures or particles, intensity of scattered light is strongly reduced due to the weaker scattering profile, and an amplitude of interference fringes is too weak to allow imaging the structures or particles. Reduction of scattered light may occur even for larger particles, in case the difference in refractive index between the particles and the surrounding medium is small, for example less than 0.5.

Having a large background signal, in comparison to a sample signal (the scattered light) reduces imaging quality and is a large drawback for digital holography imaging systems. Instead, invasive imaging methods are used to image small samples. The invasive methods may destroy rare samples and limit the possibilities to perform multiple analyses of the sample and long-time imaging, such as time-lapse imaging. The non-invasive methods provided by digital holography imaging may be used without damaging the sample, making it possible to study the sample using multiple analyses methods as well as for a longer timespan.

Thus, there is a need in the art for an imaging system for imaging small particles or structures, such as particles smaller than the wavelength of the light used for imaging.

SUMMARY

An objective of the present inventive concept is to mitigate, alleviate or eliminate one or more of the above-identified deficiencies in the art and disadvantages singly or in any combination. These and other objectives are at least partly met by the invention as defined in the independent claims. Preferred embodiments are set out in the dependent claims.

According to a first aspect of the present inventive concept there is provided an imaging device for holographic imaging of a sample, the imaging device comprising:

a light source configured to generate a light beam;

a beam splitter configured to receive the light beam and to split the light beam into an object beam along an object beam path in the imaging device and a reference beam along a reference beam path in the imaging device;

a detector comprising an array of light sensitive areas;

wherein the imaging device defines a sample position, the sample position being configured for receiving the sample;

wherein the object beam path is arranged in the imaging device such that the object beam is propagated through the sample position, and wherein the detector is arranged in relation to the object beam path so as to prevent non-scattered object light, passing through the sample position without being scattered by the sample, from being incident onto the array of light sensitive areas;

wherein the reference beam path is arranged in the imaging device such that the reference beam is propagated through the sample position, and wherein the detector is arranged in relation to the reference beam path so that non-scattered reference light, passing through the sample position without being scattered by the sample, is incident onto the array of light sensitive areas; and wherein the detector is configured to detect an interference pattern formed by interference between scattered object light, being scattered by the sample, and the non-scattered reference light.

By the term "light source" is here meant any unit, device and/or element at which light is generated. By way of example, the light source may be, but is not limited to a laser, a laser diode, a light emitting diode, an incandescent light source, a fluorescent light source, or a combination thereof. In this context the term "light" should be allowed a wider interpretation, not limited to visible electromagnetic radiation but may also include for example ultra-violet light and infra-red light.

By way of example, the light source may be coupled to an optical fiber, a waveguide, a photonic chip or free-space optical elements to guide, shape, and modify the optical properties of the light beam from the light source through the object beam path and the reference beam path of the imaging device.

By the term "beam splitter" is here meant any unit, device and/or element with the capability of splitting incident light into at least two separate light paths, at least one of which follows a path based on the incident light path being redirected at the beam splitter. Given as a non-limiting example, a beam splitter may be in the form of a beam splitter cube comprising two triangular prisms glued together at their respective bases. Given as another non-limiting example, a beam splitter may be in the form of a mirror comprising a transparent substrate onto which a partially transparent and partially reflective coating is arranged. By way of example, such a coating may be a metallic or dichroic coating, or any other suitable coating. Given as yet another non-limiting example, the beam splitter may be fiber optics, or a photonic chip configured to split the light beam into multiple beam paths with equal or different light intensity. The beam splitter, when splitting the light, may change a property of the light. By way of example, the property changed by the beam splitter may be, but is not limited to, a polarization, a wavelength a spatial mode of the light in free space, a spatial mode of the light in a light guide, or any other light property suitable for splitting the light.

A beam splitter may split incident light evenly into the two paths such that 50% of the incident light intensity propagates along one of the paths and 50% of the light intensity propagates along the other path. Alternatively, a beam splitter may split the incident light unevenly into the two paths such that light in one of the paths has a higher light intensity than the light in the other path.

It should be realized that the imaging device may further comprise other optical elements providing for the beam paths. Such optical elements may be different for different embodiments of the invention. By way of example, the imaging device may further comprise one or more optical filters, spatial filters, reflectors, and/or pinholes. The optical elements may be configured to change a property of the light, such as an intensity, a polarization, an optical path length, a spatial mode, or any other suitable property.

By the term "light sensitive area" is here meant an area reacting to light impinging onto the area, by generating an electrical signal as a response to the light intensity. An array of light sensitive areas may be arranged on a detector, configured to allow read-out of the electrical signals representing incident light on the array. Given as non-limiting examples, light sensitive areas may be found on photo-diodes, photo-multiplier tubes (PMT), and pixels on image detectors such as charge-coupled devices (CCD) and complementary metal oxide semiconductors (CMOS). By way of example, an array of light sensitive areas may be in the form of pixels on a CCD or CMOS detector, but may alternatively comprise a plurality of any other type of light sensitive areas.

The sample may be a biological sample, such as for instance a cell sample, or a virus sample. The sample, a biological sample or another sample, may comprise small objects. The sample may be a cell sample where the cells are very thin, or where the refractive index of the cells are close to the refractive index of the surrounding medium, wherein an intensity of scattered light is weak.

The object beam path is arranged in the imaging device such that the object beam is propagated through the sample position. The object beam may be guided along the object beam path by means of optical components. Given as non-limiting examples, such optical components may be mirrors, lenses, waveguides, or any other optical components suitable for guiding light along a path. The object beam path and the detector are arranged with respect to each other such that non-scattered object light is prevented from reaching the array of light sensitive areas on the detector. By the term "non-scattered object light" is here meant light from the object beam, propagated along the object beam path in the imaging device, which is not scattered by the sample in the sample position. In other words, "non-scattered object light" may comprise light from the object beam that is passed through the sample in the sample position without being scattered. Thus, only light from the object beam scattered by the sample may reach the array of light sensitive areas. The rest of the light from the object beam may propagate through the sample, and out of the sample position without being scattered. The non-scattered object light may be absorbed at a distance away from the sample position, to prevent any further propagation of the non-scattered object light.

The object beam path may be set up so as to prevent or substantially reduce light from the object beam from being scattered by other entities or at least prevent or substantially reduce light being scattered by other entities from reaching the detector. By way of example, such light may comprise light being scattered by parts of the imaging device or a sample holder, such as glass parts, mirrors, lenses, windows, internal walls, or other parts that may scatter light. Light being scattered off of such parts may be prevented from reaching the detector for example by arranging such parts outside, and preferably at a distance from the sample position so that no such parts are arranged inside the sample position. Further, light may be prevented from being scattered off of such parts by e.g. surface treatment of such parts.

The reference beam path is arranged in the imaging device such that the reference beam is propagated through the sample position. The reference beam path and the detector are arranged with respect to each other so that non-scattered reference light is incident onto the array of light sensitive areas on the detector. By the term "non-scattered reference light" is here meant light from the reference beam propagated along the reference beam path in the imaging device, which is not scattered by the sample in the sample position.

Interference between scattered object light, being scattered by the sample, and the non-scattered reference light reaching the array of light sensitive areas forms an interference pattern. The detector is arranged to detect the interference pattern, and thereby acquire an image representation of the sample.

The term "imaging" of a sample is herein regarded as any representation or reproduction of a form of an object. The imaging need not necessarily provide a visual representation of the object. Thus, imaging may be provided by forming and detecting of the interference pattern. By detecting the interference pattern formed by interference between the scattered light from the sample and the non-scattered light, information about the three-dimensional shape of the sample is acquired in terms of a digital hologram. Such information enables generation of a visual image of the sample, by means of holographic reconstruction.

An advantage of the first aspect is that balancing of the light intensities of the object beam and the reference beam is enabled. Balancing the light intensities may in turn improve the signal-to-noise ratio (SNR) of the interference pattern.

According to the first aspect, the object beam path is decoupled from the reference beam path, such that scattered light and non-scattered light detected by the detector is not based on light from the same beam path. Still, the reference beam path is defined to pass through the sample, corresponding to set-up of in-line holographic microscopy.

In particular, for smaller structures or particles, intensity of scattered light is strongly reduced. By enabling balancing of light intensities of the object beam and the reference beam, a ratio of scattered light signal to non-scattered light signal may be controlled, such that the interference pattern is not drowned in noise of the reference beam signal.

Thus, imaging of small objects may be enabled. More specifically, the concept may enable imaging of objects with the size in the same range or smaller than the wavelength of the light. Object of such small size have a low scattering cross-section, and thus a large portion of the light being passed through the sample may pass without being scattered. However, by the present arrangement the capability of the imaging objects smaller than the wavelength of the light may be provided with improved signal-to-noise ratio, high throughput, and simple hardware.

According to an embodiment, the beam splitter is further configured to split the light beam such that a light intensity of the object beam is higher than a light intensity of the reference beam.

According to an embodiment, the beam splitter is further configured to split the light beam such that the ratio of the light intensity of the object beam to the light intensity of the reference beam is greater than 1, preferably greater than 3, more preferably greater than 10 and even more preferably greater than 19.

An advantage with this embodiment is that an improved balance between the object light and the reference light may be provided. The interference pattern is formed by interference of scattered object light and non-scattered reference light. The scattering cross-section of small objects is low, meaning that when a sample comprises small objects, the object light being scattered will be only a small portion of the object light incident onto the sample. The reference light on the other hand, is guided through the sample and towards the detector, and in case the sample comprises only small object only a small portion of the reference light will be scattered and consequently the major part of the reference light will reach the detector. If the light from the light source is evenly split by the beam splitter into the object light path and the reference light path, the reference light reaching the detector will have a significantly higher intensity than the object light reaching the detector for small objects, such as objects smaller than 1 μm, leading to poor quality of the interference pattern. However, by splitting the light unevenly such that more light is provided in the object light path than in the reference light path, the object light and the reference light reaching the detector may be balanced such that a better quality of the interference pattern also for imaging of small objects may be provided.

It should be realized that the light intensity of the object beam being higher than the light intensity of the reference beam may be provided also by alternative manners. By way of example, the beam splitter may be configured to split the light beam such that the intensity of the reference beam is equal to or higher than the intensity of the object beam. Following the splitting, and prior to the reference beam reaching the sample position, the reference beam may be attenuated such that the intensity of the reference beam reaching the sample position is lower than the intensity of the object beam reaching the sample position. Attenuation of the reference beam may be provided by an optical attenuator being arranged in the reference beam path between the beam splitter and the sample position. Given as a non-limiting example, an optical attenuator may be an optical filter such as an optical neutral density filter.

According to an embodiment, the imaging device is further configured such that a cross-section of the object beam, upon being propagated through the sample position, is confined in at least one direction.

By the cross-section of the object beam being confined in at least one direction is here meant that the cross-section of the object beam, in the at least one direction, does not exceed a given size. By way of example, the cross-section of the object beam may be confined to not exceed dimensions given by the dimensions of the sample position, so that the object beam illuminates only the sample but not parts of the imaging device in the vicinity of the sample position. Given as non-limiting examples, the dimensions of the cross-section of the object beam may be restricted by a width and/or height of a receptacle for a sample holder or a with and/or height of a sample holder, or a width and/or height of a flow channel in which a sample may be contained. For example, if the sample is contained in a volume having a height of 40 μm across a length of 4 mm, then the beam must not exceed a height of 40 μm anywhere along the 4 mm length of the sample.

It should further be realized that the object beam may be confined to dimensions smaller than a size of the sample. This implies that a portion of the sample may be imaged. The object beam may further be scanned over the sample, e.g. by moving the sample and/or the object beam, for imaging the entire sample.

By way of example, confinement of the cross-section of the object beam may be achieved by focusing the object beam in the at least one direction such that the cross-section of the beam in the at least one direction does not exceed the given size at any location along the object beam path in the sample position. By way of further example, confinement of the cross-section of the object beam may be achieved by collimating the object beam in the at least one direction such that the object beam has a uniform cross-section long the object beam path in the sample position, and that the uniform cross-section is smaller than the given size. By way of example, the object beam may be confined to a thin sheet or to a small dot.

By confining the cross-section of the object beam to such dimensions reflections of object light off of parts of the imaging device or a sample holder may be prevented. Such reflections may otherwise affect the interference pattern, and in this manner jeopardize the imaging quality. By way of example, confinement of the object beam may be achieved by focusing of the object beam in at least one direction. In this manner it may be ensured that the beam does not exceed the height and width of the sample as the object light propagates through the sample. By way of further example, confinement of the object beam may be achieved by collimation of the object beam in at least one direction.

Typically, in microscopy applications, the sample may be limited to a small size in at least one dimension. Given as non-limiting examples the sample may be limited to, such as having a diameter limited to, 100 μm or 40 μm.

According to an embodiment, the imaging device is further configured such that the object beam, upon being propagated through the sample position, is in a shape of a light sheet.

By the term "light sheet" is here meant a beam of light shaped such that the cross-section of the light beam, across the direction of propagation, is significantly larger in a first direction than in a second direction perpendicular to the first direction. A light sheet forms a substantially planar illumination. A light sheet may be suitable for illuminating a thin slice of an at least partially transparent sample. A light sheet may be collimated such that the dimensions of the light sheet are constant along the direction of propagation of the light sheet. Alternatively, a light sheet may be divergent such that the cross-section of the light sheet becomes increasingly larger along the direction of propagation, in at least one direction.

By way of example, a light sheet may be achieved by expanding a light beam, e.g. with a circular cross-section, in the first direction and by compressing it in the second direction, such that the light beam takes the form of a thin sheet of light.

Given as a non-limiting example, reshaping of a light beam may be achieved by arranging one or more lenses in the beam path. For example, a cylindrical lens may be arranged in the beam path or a combination of a spherical and a cylindrical lens may be arranged in the beam path. Given as another non-limiting example, a light sheet may be achieved by using a light source from which the output beam is shaped as a light sheet. Such a light source may be a laser with an output beam having a rectangular cross-sectional shape. Given as yet another non-limiting example a light sheet may be achieved by using a planar or non-planar substrate configured to transform a light beam into a light sheet upon reflection or transmission of light.

It is conceivable that planar illumination of a sample may be achieved also by means of a light beam scanning a planar section of the sample. By way of example, a light beam may be scanned by using a scanning mirror, or an opto-acoustic modulator. Although a scanning light beam is technically not a light sheet, it may provide substantially the same or similar type of illumination. With a rapidly scanning device, the light beam may be made to scan the full imaged portion of the sample without any significant movement of the sample taking place.

It is further conceivable that volumetric illumination of a sample may be achieved by means of a light sheet scanning through a number of planar sections of the sample. For example, a light sheet may be scanned in a direction perpendicular to the direction in which the light sheet is extended. Given as a non-limiting example, detection of light from different light sheet positions may provide a number of two-dimensional images of different sections of the sample, which may be used to reconstruct a full three-dimensional representation of the sample.

According to an embodiment, the imaging device further comprises sheet optics arranged in the object beam path, the sheet optics being configured to shape the object beam to a light sheet prior to the object beam being propagated through the sample position.

An advantage with this embodiment is that a light sheet may be achieved using standard optical components. In this manner a light sheet-based device may be provided at a low cost.

According to an embodiment, the detector is arranged with respect to the object beam such that the object beam path through the sample position extends in a direction parallel with a plane of the detector onto which the array of light sensitive areas is arranged.

An advantage with the present embodiment is that the object beam may be arranged to propagate close to the plane of the detector with the array of light sensitive areas without non-scattered light of the object beam impinging onto the detector. Arranging the sample close to the detector is also advantageous in terms of image quality. If the objects in the sample are very small, the scattering cross-section is low, but by arranging the detector close to the sample a large part of the scattered light may still reach the detector, thereby increasing the signal-to-noise ratio.

According to an embodiment, the light source is configured to generate light being at least partly coherent.

According to an embodiment, the light source is a laser.

The at least one light source may be configured to generate at least partially coherent light. A temporal coherence of the light source may be such that a coherence length of the light is larger than a difference in optical path length between the object beam path and the reference beam path.

Coherent light may be advantageous as it improves the interference visibility. A coherent light source may be a laser. However, it should be understood that also partially coherent light may provide an interference pattern with sufficient visibility. A partially coherent light source may e.g. be a light emitting diode, LED, emitting light through a pinhole onto the sample in the container. A coherent light source may provide better interference visibility but may be more expensive while a partially coherent light source may provide a less clear interference visibility but may be less expensive. The at least partially coherent light may create an interference pattern, formed by interference between light scattered by the sample and non-scattered light, at the array of light sensitive areas.

According to an embodiment, the imaging device further comprises a receptacle configured to receive a sample holder in which the sample may be placed, and to hold the sample holder such that the sample in the sample holder is located in the sample position.

By the term "sample holder" is here meant any unit, device or element with suitable properties for holding the sample, and allowing light to be guided to and from the sample. By way of example, the sample holder may be in the form of an objective slide, or a similar thin, rectangular plate onto which the sample may be placed. The sample holder may be in the form of flow channel, through which channel a liquid with the sample may be flown, or alternatively the liquid with the sample may be stationary placed within the channel. For instance, the flow channel may be integrated on a chip or arranged in a compact device. The sample holder may be made of a transparent material, allowing light to be guided to and/or through the sample, and allowing light from the sample to pass out of the sample holder to reach the detector.

In order to minimize light reflections from the sample holder, surfaces of the sample holder may be provided with anti-reflection coating. Alternatively or additionally, light reflections from the sample holder may be minimized by applying refractive index matching between the sample medium and the sample holder.

By the term "receptacle" is here meant any unit, device or element arranged in the imaging device and configured for receiving and holding a sample holder. By way of example, a receptacle may be a plate with a hole onto which the sample holder may rest such that light from the sample may pass through the hole to reach the detector. The receptacle may, but is not limited to, comprise one or more clamps to fasten the sample holder in the receptacle. The receptacle may, but is not limited to, comprise one or more slits into which the sample holder may be inserted.

According to an embodiment, the imaging further comprises a flow channel configured for receiving a flow of a fluid in which the sample is contained, the flow channel being arranged such that the flow through the flow channel is passed through the sample position.

According to an embodiment, the imaging device may further comprise a processing unit configured to perform digital holographic reconstruction on the interference pattern detected by the array of light sensitive areas to generate an image of the sample.

The processing unit may be arranged internally in the device. Alternatively, the processing unit may be arranged in an external unit, such that the digital holographic reconstruction may take place elsewhere. Data of the interference patterns detected by the array of light sensitive areas may be transferred to the processing unit, either by a wired connection or wirelessly. As yet another alternative, the processing unit for performing digital holographic reconstruction may be distributed among physical units, such that parts of the digital holographic reconstruction may be performed in different physical units.

It should be understood that any suitable algorithm for performing the digital holographic reconstruction may be used, as known to the person skilled in the art, including a Gerchberg-Saxton algorithm or multi-acquisition (multi-depth and/or multi-wavelength) for phase retrieval, or reconstruction based on angular spectrum diffraction by means of Gabor wavelet transform. However, it should also be understood that, in certain applications, digital holographic reconstruction may not be necessary in order to extract useful information from the acquired image data. For example, information about the location of particles in the sample may be determined directly from the hologram without the need for reconstruction of a visual image.

According to a second aspect of the present inventive concept there is provided a method for holographic imaging of a sample located in a sample position, the method comprising:

generating, by a light source, a light beam;

receiving, at a beam splitter, the light beam;

splitting, by the beam splitter, the light beam into an object beam along an object beam path and a reference beam along a reference beam path;

propagating the object beam through the sample position so as to prevent non-scattered object light, passing through the sample position without being scattered by the sample, from being incident onto an array of light sensitive areas;

propagating the reference beam through the sample position so that non-scattered reference light, passing through the sample position without being scattered by the sample, is incident onto the array of light sensitive areas; and detecting, by a detector comprising the array of light sensitive areas, an interference pattern formed by interference between scattered object light, being scattered by the sample, and the non-scattered reference light.

According to an embodiment, the method further comprises:

splitting, by the beam splitter, the light beam such that a light intensity of the object beam is higher than a light intensity of the reference beam.

According to an embodiment, method further comprises:

shaping the object beam to a light sheet prior to propagating the object beam through the sample position.

According to an embodiment, the method is used for imaging an object in the sample that is smaller than a wavelength of the light.

Effects and features of the second aspect are largely analogous to those described above in connection with the first aspect. Embodiments mentioned in relation to the first aspect are largely compatible with the second aspect. It is further noted that the inventive concepts relate to all possible combinations of features unless explicitly stated otherwise.

Other objectives, features and advantages of the present inventive concept will appear from the following detailed disclosure, from the attached claims as well as from the drawings.

BRIEF DESCRIPTIONS OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIG. 1 schematically illustrates an imaging device for holographic imaging of samples.

Figure 2A:
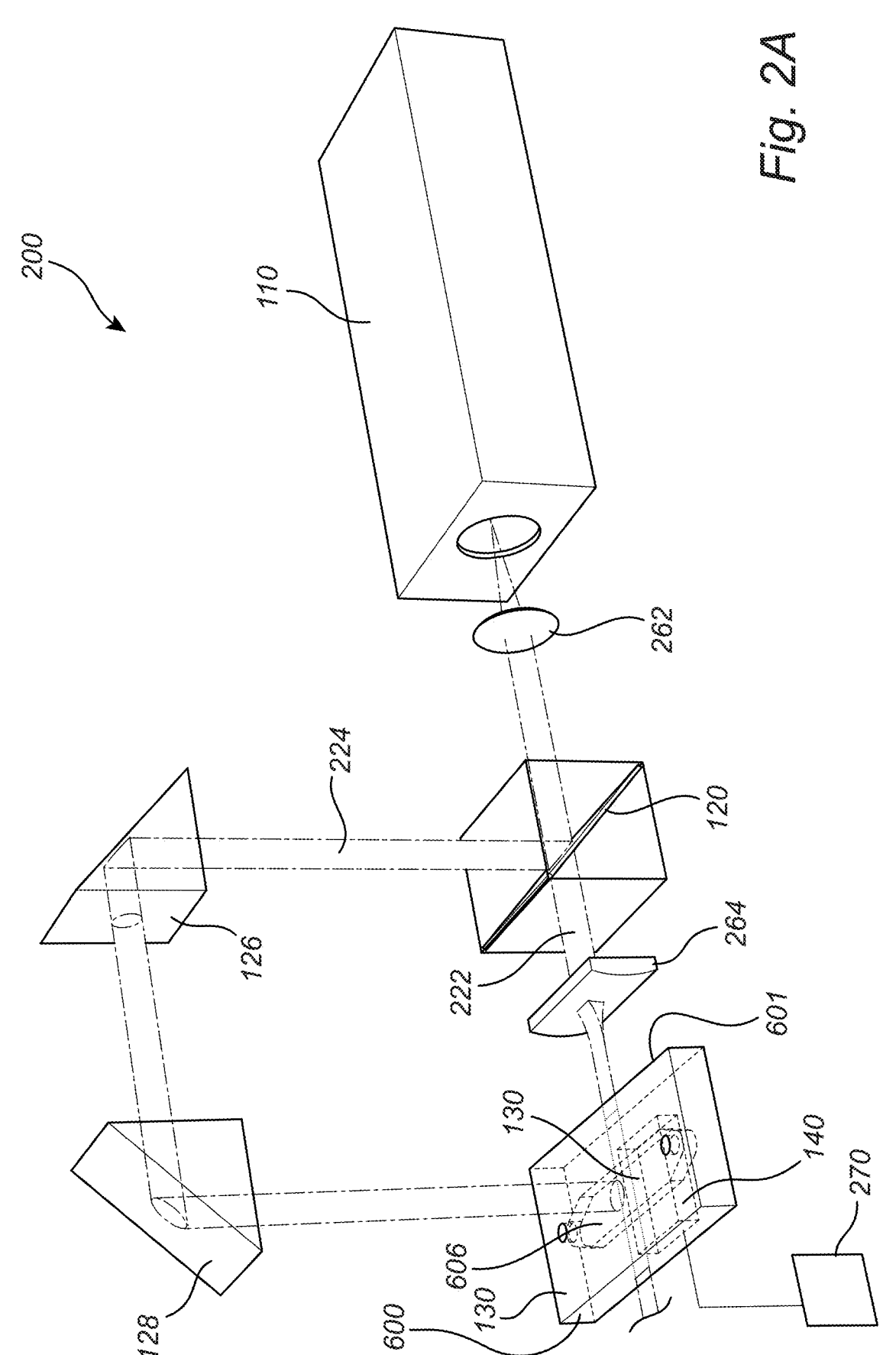

FIG. 2A schematically illustrates an imaging device for holographic imaging of samples, configured with light sheet object illumination.

Figure 2B:
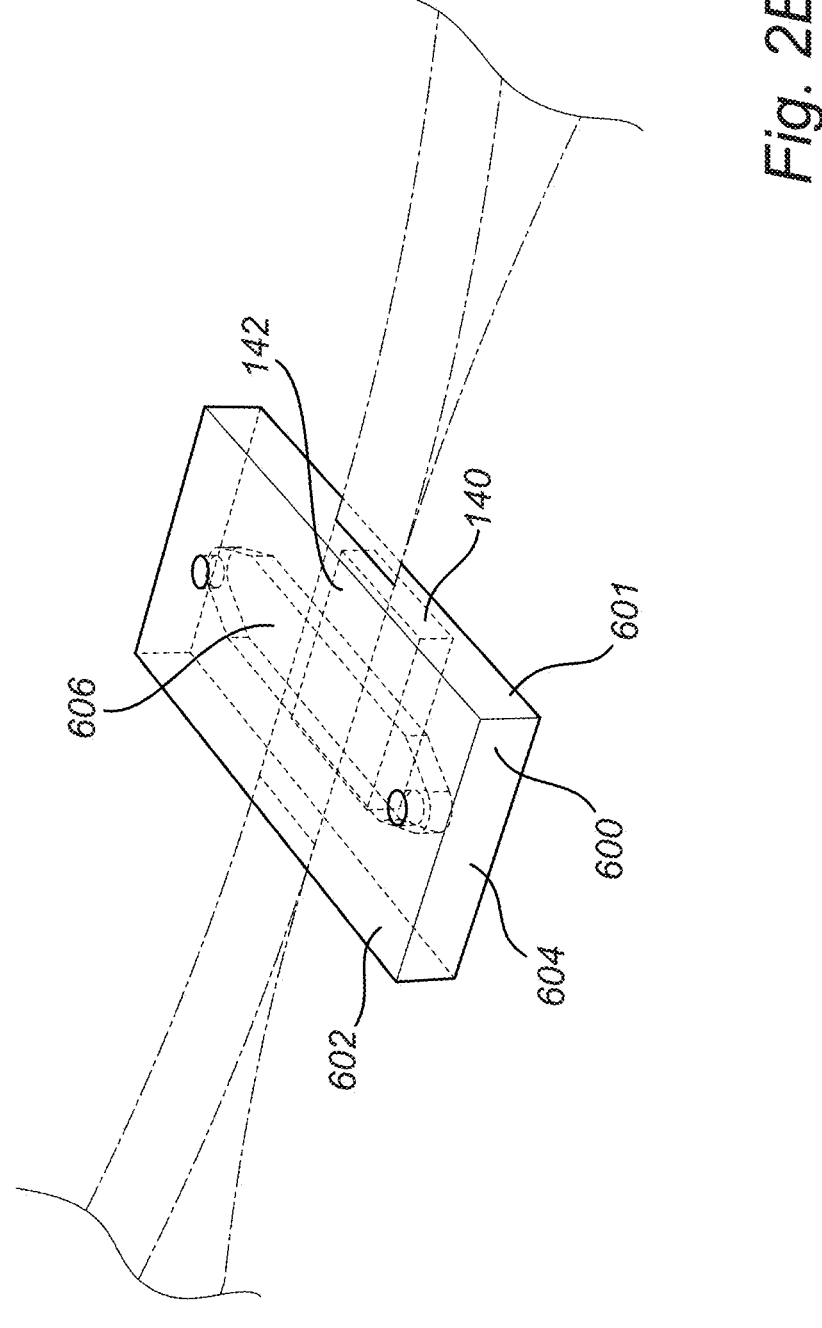

FIG. 2B schematically illustrates the details of light propagation in the imaging device, through the sample holder.

Figure 2C:
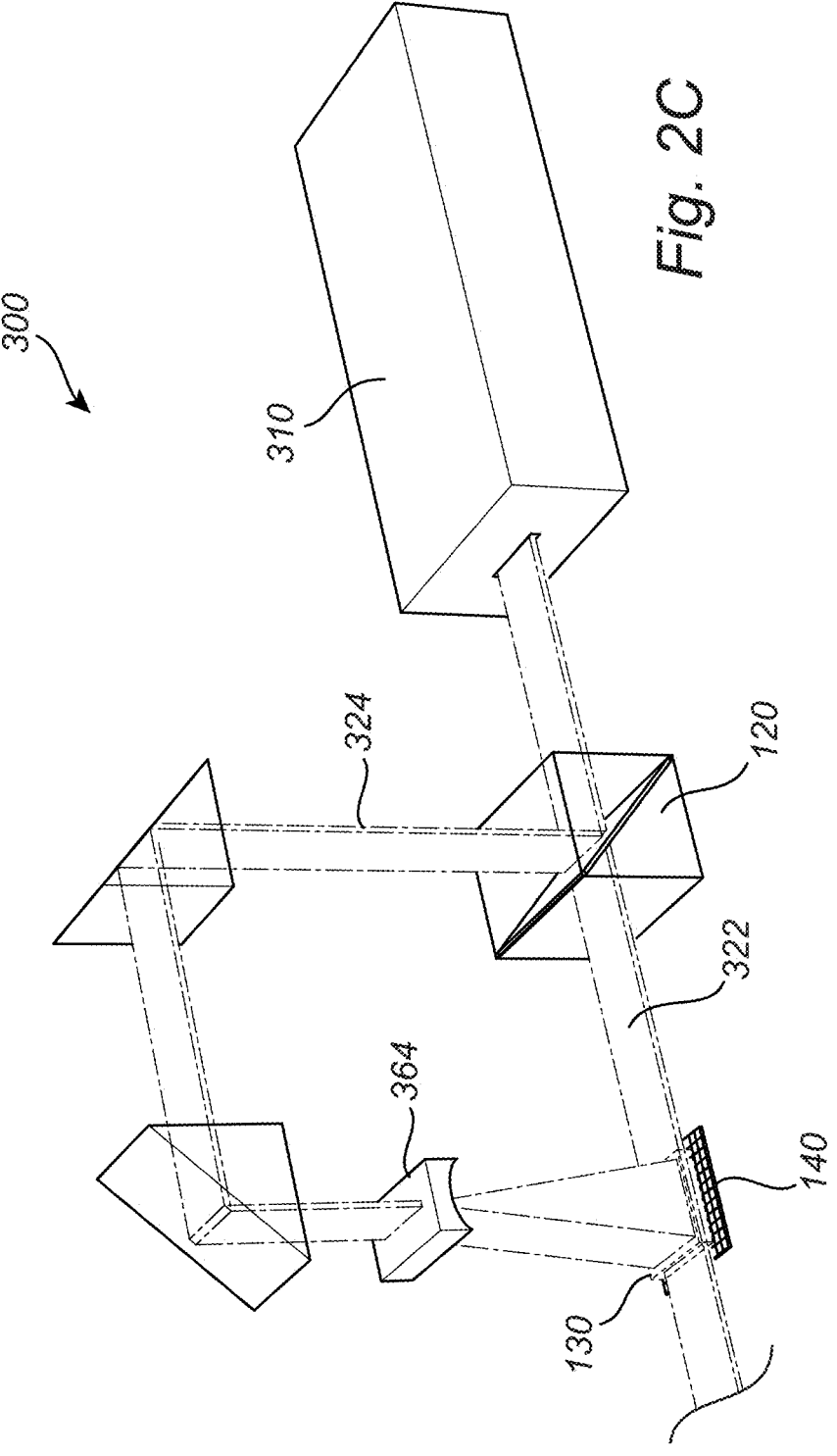

FIG. 2C schematically illustrates an imaging device for holographic imaging of samples, comprising a light source with an output beam having a rectangular cross-section.

Figure 3A:
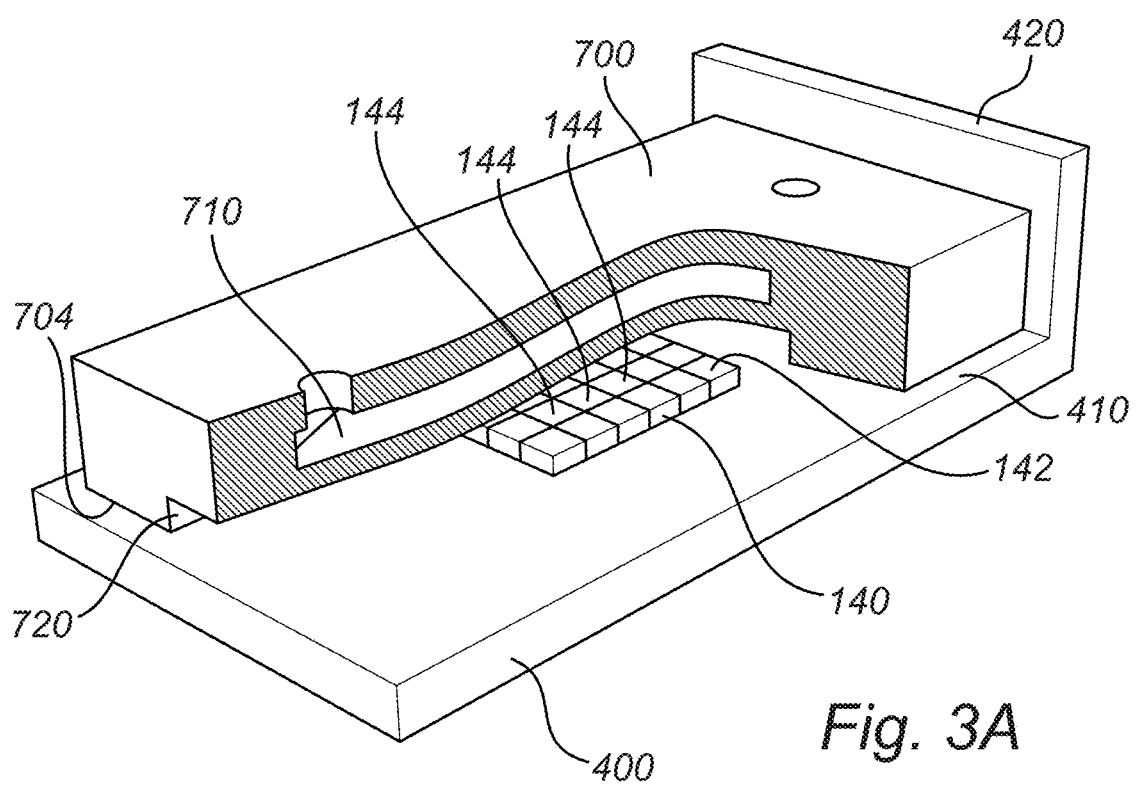

FIG. 3A schematically illustrates a receptacle that may form part of an imaging device for holographic imaging of samples.

Figure 3B:
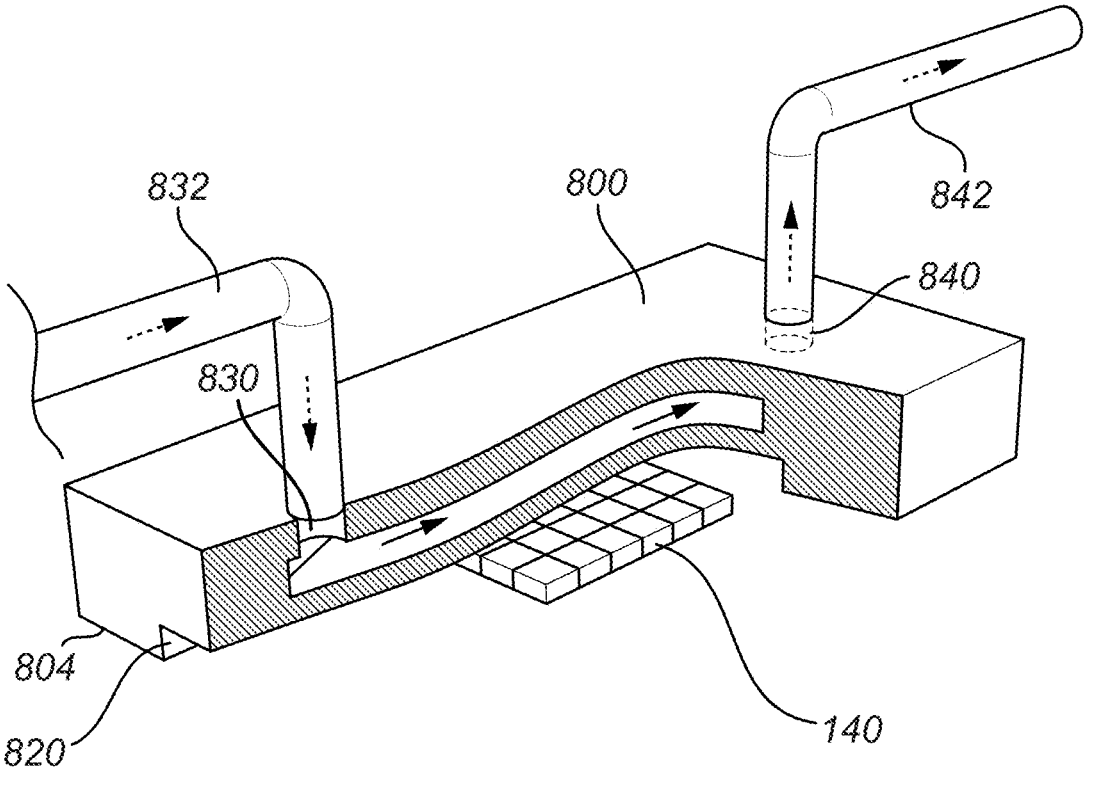

FIG. 3B schematically illustrates a flow channel that may form part of an imaging device for holographic imaging of samples.

Figure 3C:
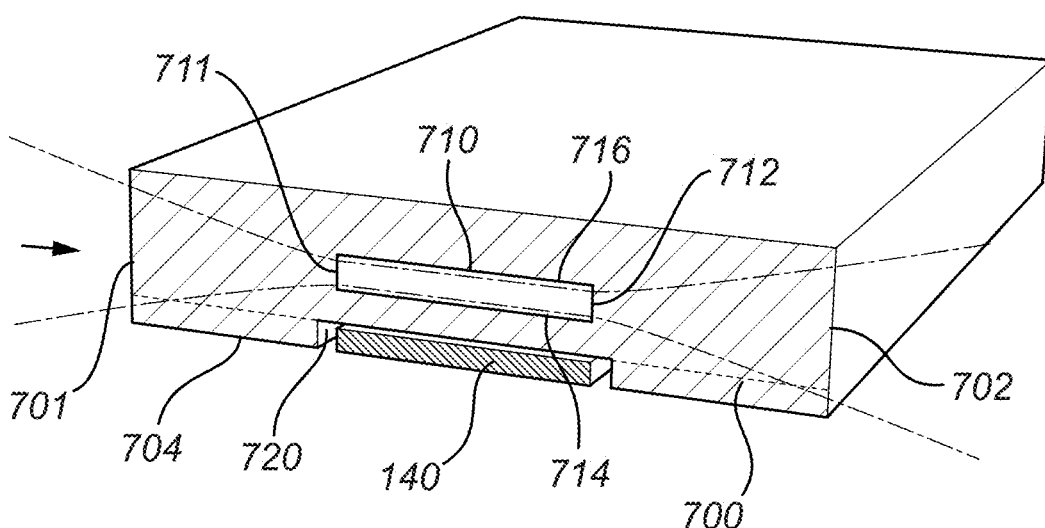

FIG. 3C schematically illustrates a cross-sectional view of the sample holder and the details of light propagation of object beam focused into a light sheet, through the sample holder and the sample.

FIG. 4 illustrates a schematic block diagram shortly summarizing the method for holographic imaging of a sample located in a sample position.

DETAILED DESCRIPTION

In cooperation with attached drawings, the technical contents and detailed description of the present inventive concept are described hereinafter according to a preferable embodiment, being not used to limit the claimed scope. This inventive concept may be embodied in many different forms and should not be construed as limited to the embodiments set forth herein; rather, these embodiments are provided for thoroughness and completeness, and fully convey the scope of the inventive concept to the skilled person.

FIG. 1 schematically illustrates an imaging device 100 for holographic imaging of samples. The samples typically comprise small objects of a size comparable to or smaller than the wavelength of the light illuminating the samples.

The imaging device 100 comprises a light source 110 configured to generate a light beam. In FIG. 1 the light beam is illustrated at having a circular cross-section, but it should be understood that the light beam is not limited to having a circular cross-section but may have other cross-sectional shapes. For example, the light beam may have an elliptical, squared or rectangular cross-section. The light source 110 is a laser generating light being at least partly coherent. However, it should be understood that the light source may alternatively be another type of light source, for example a light emitting diode, LED.

The light beam from the light source 110 is guided to a beam splitter 120. The beam splitter 120 splits the light beam into two separate beams, namely an object beam along an object beam path 122 in the imaging device 100 and a reference beam along a reference beam path 124 in the imaging device 100. In FIG. 1 the beam splitter is illustrated as a beam splitter cube, however, it is conceivable that the beam splitter may alternatively be of a different type, such that the splitting of the light beam into separate beam paths is achieved in a different manner. For example, FIG. 1 illustrates the reference beam path 124 at a 90° angle with respect to the object beam path 122 directly following the beam splitter 120, however, it is conceivable that the beam paths are split at also other angles than 90°.

The object beam path 122 is arranged in the imaging device 100 such that the object beam is propagated through a sample position 130 defined in the imaging device 100. The sample position 130 is configured for receiving the sample to be imaged by the imaging device 100. In FIG. 1 the sample position 130 is illustrated as dotted lines, as the sample may be received and held in place in the imaging device 100 in a number of different manners. Examples are provided in some of the following figures.

When a sample is present in the sample position 130, objects in the sample may scatter some of the light of the object beam. It should be understood that if the objects in the sample are small, as for example comparable to or smaller than the wavelength of the light from the light source 110, the scattering cross-section is small and thus only a minor portion of the light of the object beam may be scattered by the sample. In such case, a major part of the light in the object beam may pass through the sample without being scattered.

The imaging device further comprises a detector 140 with an array 142 of light sensitive areas 144. Each light sensitive area 144 is configured to generate an electrical signal dependent on the intensity of light incident onto the light sensitive area 144. The detector 140 is arranged just below the sample position 130 such that the array 142 of light sensitive areas 144 is facing the sample position. Thus, light of the object beam scattered by the sample may be incident onto the array 142 of light sensitive areas 144 of the detector 140. Further, the detector 140 is arranged spaced from but in the vicinity of the object beam path 122. By the present arrangement, non-scattered object light, passing through the sample position 130 without being scattered by the sample, may be prevented from being incident onto the array 142 of light sensitive areas 144.

The reference beam path 124 is arranged in the imaging device 100 such that the reference beam is propagated through the sample position 130. The reference beam path 124 is arranged so that non-scattered reference light, passing through the sample position 130 without being scattered by the sample, is incident onto the array 142 of light sensitive areas 144. In other words, the reference beam path 124 passes through the sample position 130 and impinges onto the detector 140.

In FIG. 1 the reference beam path is illustrated to be redirected by means of two prisms 126, 128 such that the reference beam is propagated through the sample position 130 and towards the detector 140. However, it should be understood that the reference beam path 124 may be guided in a number of different manners to pass through the sample position 130. For example, the number of prisms used may be less than or greater than two. Alternatively, some or all of the prisms may be replaced by other optical components, such as mirrors. Further, it should be understood that, although the object beam path 122 is illustrated in FIG. 1 as going straight from the light source 110 to the sample position 130 without being redirected, the object beam path 122 may alternatively comprise one or more beam guiding optics, such as prisms, mirrors, or optical fibers, in order to guide the object beam to the sample position 130.

As mentioned also in relation to the object beam path 122, if the objects in the sample are small, the scattering cross-section is small. Thus, only a minor portion of the light of the reference beam may be scattered by the sample. In such case, a major part of the light in the reference beam may pass through the sample without being scattered and reaching the array 142 of light sensitive areas 144 of the detector 140.

Light of the object beam scattered by the sample and non-scattered light from the reference beam is transmitted to the array 142 of light sensitive areas 144. An interference pattern is formed by interference between the scattered light and the non-scattered light in the plane of the array 142, and the array 142 of light sensitive areas 144 is configured to detect the interference pattern, so as to image the sample.

By detection of the interference pattern formed by interference between the scattered light from the sample and the non-scattered light, information about the three-dimensional shape of the sample is acquired in terms of a digital hologram. Such information enables generation of a visual image of the sample, by means of holographic reconstruction. The imaging device 100 offers the capability of imaging samples of very small objects, by holographic imaging, with improved signal-to-noise ratio. Such samples may comprise cells, viruses, bacteria or cell components such as mitochondria or exosomes. The imaging device 100 as described above may further provide high, sub-micron image resolution, which is often a requirement in applications in the fields of life science and medical research and industry.

The beam splitter 120 may be configured to split the light beam equally between the object beam and the reference beam, such that the two beams have substantially the same light intensity. This may be relevant for imaging of relatively large objects, such as objects having a size (diameter) larger than 1 μm. However, in the case of imaging very small objects, such an arrangement may result in the reference light reaching the detector having a significantly higher intensity than the object light, due to the low scattering cross-section of the small objects. Large intensity differences between the object light and the reference light reaching the detector 140 may result in an interference pattern with low contrast of the fringes, and thus poor image quality.

As an alternative, the beam splitter 120 may be configured to split the light beam such that a light intensity of the object beam is higher than a light intensity of the reference beam. By such an arrangement, the intensity difference between the object light and the reference light reaching the detector 140 may be balanced out to more equal intensity levels, as well as better utilization of the light from the light source 110. By the present arrangement, better contrast of interference fringes may be obtained and consequently better image quality. By way of example, the beam splitter may be configured to split the light beam such that the ratio of the light intensity of the object beam to the light intensity of the reference beam is greater than 1, preferably greater than 3, more preferably greater than 10 and even more preferably greater than 19.

FIG. 2A schematically illustrates an imaging device 200 for holographic imaging of samples, configured with light sheet object illumination. Imaging device 200 shares some of the features with imaging device 100 described in relation to FIG. 1, the details of which are not repeated here.

The imaging device 200 comprises a light source 110 configured to generate a light beam. The light beam is guided through a collimating spherical lens 262 ensuring that the light beam is collimated or at least improving collimation of light. The light beam from the light source is subsequently guided to a beam splitter 120 splitting the light beam into two separate beams, namely an object beam along an object beam path 222 in the imaging device 200 and a reference beam along a reference beam path 224 in the imaging device 200.

The object beam path 222 is arranged in the imaging device 200 such that the object beam is propagated through a cylindrical lens 264 focusing the collimated object beam in one cross-sectional direction. The cylindrical lens 264 is arranged at a distance from the center of the sample position 130 along the object beam path 222, the distance corresponding to the focal length of the cylindrical lens 264. By the present arrangement the object beam is shaped into a light sheet when propagating though the sample position 130.

The sample is held in the sample position 130 by a sample holder 600 inserted in the imaging device 200. The sample holder 600 is made of a transparent material, allowing the light sheet to enter into an entrance side 601 of the sample holder 600 upon propagation to the sample in the sample position 130. Object light of the light sheet, scattered by the sample, is transmitted through the bottom 604 of the sample holder therethrough reaching the detector 140.

The two lenses 262, 264 arranged in the object beam path contribute in shaping the object beam into a collimated thin light sheet. As such, the two lenses 262, 264 are functioning as light sheet optics. However, it should be understood that light sheet optics for shaping the object beam into a light sheet may comprise different sets of lenses. Given as non-limiting examples, the light sheet optics may comprise a combination of a negative cylindrical lens followed by a positive spherical lens, or a single positive cylindrical lens.

Similarly as to what has been described in relation to imaging device 100, the reference beam path is redirected by means of two prisms 126, 128, such that the reference beam is propagated through the sample position 130 and towards the detector 140. The reference beam thus enters the top 606 of the sample holder 600 upon propagating towards the sample in the sample position 130. Non-scattered reference light may exit the sample holder 600 through the bottom 604, in order to reach the detector 140.

Light of the object beam scattered by the sample and non-scattered light from the reference beam is transmitted to the array 142 of light sensitive areas 144. The interference pattern formed by interference between the scattered light and the non-scattered light in the plane of the array 142, may subsequently be detected by the detector 140, so as to image the sample.

In FIG. 2A, the detector 140 is connected to a processing unit 270 configured to perform digital holographic reconstruction on the interference pattern acquired by the detector 140 to generate an image of the sample. Any suitable algorithm for performing the digital holographic reconstruction may be used, as known to the person skilled in the art, such as including a Gerchberg-Saxton algorithm or multi-acquisition (multi-depth and/or multi-wavelength) for phase retrieval, or reconstruction based on angular spectrum diffraction by means of Gabor wavelet transform.

It should be understood that although the processing unit 270 is here illustrated as being an internal device of the imaging device 200, the processing unit may alternatively be arranged in an external unit, or it may be processing unit of an external computer not being part of a common physical housing holding optical components.

The processing unit 270 may be implemented as a central processing unit (CPU), which may execute the instructions of one or more computer programs in order to implement functionality of the processing unit 270.

The processing unit 270 may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement functionality of the processing unit 270.

FIG. 2B schematically illustrates the details of light propagation in imaging device 200, through the sample holder 600. The height of the object beam being focused is advantageously smaller than the height of the sample holder 600 entrance side 601 when the object beam reaches the entrance side 601. Further, the object beam does advantageously not exceed this height during the propagation across the entire sample holder 600. In other words, the object beam, upon being propagated through the sample position, is confined in the height direction, such that it does not exceed the height of the sample holder 600. In this manner the object beam may be prevented from illuminating the top 606 and bottom 604 of the sample holder, thereby preventing light reflections from these parts from reaching the detector 140.

Shaping the object beam into a light sheet, may ensure that the light of the object beam path 222 may pass the sample without illuminating also parts of the sample holder 600, such as the top 606 or the bottom 604. Such illumination of parts of the sample holder 600 may otherwise lead to reflections from these parts.

As illustrated in FIG. 2B the detector 140 is arranged such that the plane onto which the array 142 of light sensitive areas 144 is arranged extends in parallel with the object beam path 222, and thus the light sheet. In addition to preventing reflections from reaching the detector 140, the present arrangement also allows the detector 140 to be arranged in close proximity to the sample, without risking light from the light sheet reaching the detector 140. In this manner, more of the light scattered by the sample may reach the detector 140, thereby improving the signal-to-noise ratio.

FIG. 2C schematically illustrates an imaging device 300 for holographic imaging of samples, comprising a light source 310 with an output beam having a rectangular cross-section. The light source 310 provides an output beam having a beam height significantly smaller than the beam width. By the use of light source 310 in the imaging device 300, an alternative manner of achieving a confined object beam may be provided. Similarly to the previously described imaging devices 100, 200, the light beam from the light source 310 is guided to a beam splitter 120, splitting the light beam into two separate beams, namely an object beam along an object beam path 322 and a reference beam along a reference beam path 324. As illustrated in FIG. 2C, the height of the light beam from the light source 310 is significantly small to be considered confined within the height of the sample. Thus, no additional lens is required to make the light sheet more narrow. However, it is conceivable that if the light beam from the light source 310 is not sufficiently narrow, a cylindrical focusing lens may alternatively be arranged in the object beam path 322. Preferably such a lens should be arranged at a distance corresponding to the focal length of the lens from the center of the sample.

In the reference beam path 324, a cylindrical expanding lens is arranged, such that the narrow reference beam is expanded to cover the entire sample.

FIG. 3A schematically illustrates a receptacle 400 that may form part of any one of the imaging devices for holographic imaging of samples described herein. The receptacle 400 is configured to receive a sample holder 700 in which the sample may be placed. Once the sample holder 700 has been placed in the receptacle, the sample holder 700 is held by the receptacle 400 such that the sample in the sample holder 700 is located in the sample position of the imaging device. The receptacle 400 may comprise a receiving surface 410 onto which the sample holder 700 may rest once the sample holder 700 has been placed in the receptacle 400.

The receptacle may further comprise one or more guiding means 420, guiding the sample holder 700 to be held at the correct position in the receptacle 400. By way of example, such guiding means 420 may be in the form of one or more guiding walls extending upwards from the receiving surface 410, or one or more pins extending from the receiving surface 410 configured to mate with matching holes in the sample holder 700. Guiding means may further be in the form of one or more clamps holding the sample holder 700 firmly in place.

The sample holder 700 as illustrated in FIG. 3A comprises a channel 710 in which the sample is located. At the bottom 704 of the sample holder 700 a recess 720 is arranged, extending along the bottom 714 of the channel 710. The recess 720 is wide enough to allow the detector 140 to fit inside the recess 720. In this manner the array 142 of light sensitive areas 144 may be arranged close to the sample in the channel 710, such that more of the light from the sample may reach the light sensitive areas 144 and thus more of the light may be detected, thereby improving the signal-to-noise ratio of the imaging. For such a configuration it is conceivable that the detector 140 may be arranged on the receiving surface 410 or the receptacle 400. Alternatively, the receiving surface 410 of the receptacle 400 may comprise a hole arranged such that, when the sample holder 700 is placed in the receptacle, the sample in the channel 710 is located above the hole. In such a configuration the detector may be arranged on the other side of the hole such that it may detect light from the sample propagating through the hole.

Although the receptacle 400 is here described as being used with sample holder 700, it should be understood that the receptacle may be used with any suitable type of sample holder, as for example sample holder 600 as described in relation to preceding figures.

FIG. 3B schematically illustrates a flow channel 800 that may form part of any one of the imaging devices for holographic imaging of samples described herein. The flow channel 800 may be used as an alternative to the sample holders 600, 700 which may be inserted to and ejected from the imaging device, when switching between different samples. The flow channel 800 may be configured for receiving a flow of a fluid in which the sample is contained. The flow channel 800 may be arranged such that the flow through the flow channel 800 is passed through the sample position of the imaging device. The flow channel 800 may comprise an inlet 830 connected to an inlet tube 832. Through the inlet tube 832 the flow of a fluid in which the sample is contained may be supplied to the flow channel 800. The flow channel 800 may further comprise an outlet 840 connected to an outlet tube 842. Through the outlet tube 842 the already imaged sample may be drained from the channel 800 as new sample fluid is supplied at the inlet 830.

The flow channel 800 illustrated in FIG. 3B shows similar features as the sample holder 700 described in relation to FIG. 3A. More specifically, the flow channel may comprise a recess 820 at the bottom 804 of the flow channel 800, wide enough for allowing the detector 140 to fit inside the recess 820. However, it should be understood that also other geometrical designs of the flow channel may be conceivable, such as a flow channel with flat bottom, and thus without any recess.

FIG. 3C schematically illustrates a cross-sectional view of the sample holder 700 and the details of light propagation of object beam focused into a light sheet, through the sample holder 700 and the sample.

The height of the object beam being focused may advantageously be smaller than the height of the sample holder 700 entrance side 701 when the object beam reaches the entrance side 701. Inside the sample holder 700 the object beam propagates towards the channel 710 inside which the sample is located. Once the object beam reaches the entrance side 711 of the channel 710 the height of the object beam may advantageously be smaller than the height of the entrance side 711 of the channel 710. The beam waist of the focused object beam is arranged inside the channel 710 such that the height of the object beam does not exceed the height of the channel 710 at any point during the propagation across the channel 710. By the present arrangement the object beam may be prevented from illuminating the top 716 and bottom 714 of the channel. In the manner described above, light reflections from these parts that may otherwise reach the detector 140 may be prevented.

Given only as an example, the sample holder 700 may have a length of 30 mm, a width of 15 mm and a height of 1.8 mm. The channel 710 inside the sample holder 700 may have a length of 20 mm, a width of 15 mm and a height of 0.04 mm. For such a sample holder 700 the object beam may thus be focused such that the height of the object beam does not exceed 1.8 mm at the entrance and exit sides 701, 702 of the sample holder 700, and such that the height of the object beam does not exceed 0.04 mm at any point inside the channel 710.

This in order to ensure that the light of the object beam may pass the sample without illuminating also parts of the sample holder 700, such as the top 716 or the bottom 714. Illumination of parts of the sample holder 700 may otherwise lead to reflections that may reach the detector 140. The parts of the sample holder 700 are orders of magnitude larger than the objects of the sample, and thus reflections from such parts may be significantly stronger than the scattered light from the sample. Hence, if light reflections from the sample holder 700 occur, the signal from the sample may drown in the reflected light, and consequently not being detectably recognizable by the detector 140. However, by shaping the object beam into a thin light sheet, such reflections may be prevented, and illumination of the sample may be achieved.

As previously mentioned, at the bottom 704 of the sample holder 700 a recess 720 is arranged, extending along the bottom 714 of the channel 710. Given only as an example the thickness of the sample holder 700 between the bottom 714 of the channel and the recess 720 may be 0.15 mm. The recess 720 allows the detector 140 to fit inside the recess 720, whereby the array 142 of light sensitive areas 144 may be arranged close to the sample in the channel 710.

It is realized from FIG. 3C that using sample holder with a recess compared to making the entire sample holder thinner has the advantage that it allows the detector 140 to be arranged close to the sample and at the same time allows the height of the object beam to be larger at the entrance and exit sides 701, 702 of the sample holder 700 without the object beam also illuminating the top 706 or bottom 704 surfaces which may otherwise cause unwanted reflections. If the sample holder 700 would have had a flat bottom 704 such that it would have ended at the dashed line in FIG. 3C, it would be possible to arrange the detector close to the sample by the sample being arranged close to the bottom of the sample holder, but the height of the object beam may then be too large to fit within the height of the entrance and exit sides 701, 702, thereby causing unwanted reflections.

It should be understood that the details of object beam propagation described for sample holder 700 in relation to FIG. 3C is not restricted to sample holder 700 only. The details of beam propagation may be analogous for sample holder 600 and/or flow channel 800.

FIG. 4 illustrates a schematic block diagram shortly summarizing the method for holographic imaging of a sample located in a sample position. It should be understood that the steps of the method, although listed in a specific order herein, may be performed in any order suitable.

The method may comprise generating S402, by a light source, a light beam.

The method may comprise receiving S404, at a beam splitter, the light beam.

The method may comprise splitting S406, by the beam splitter, the light beam into an object beam along an object beam path and a reference beam along a reference beam path. The splitting may further comprise splitting, by the beam splitter, the light beam such that a light intensity of the object beam is higher than a light intensity of the reference beam.

The method may comprise shaping S408 the object beam to a light sheet prior to propagating the object beam through the sample position.

The method may comprise propagating S410 the object beam through the sample position so as to prevent non-scattered object light, passing through the sample position without being scattered by the sample, from being incident onto an array of light sensitive areas.

The method may comprise propagating S412 the reference beam through the sample position so that non-scattered reference light, passing through the sample position without being scattered by the sample, is incident onto the array of light sensitive areas.

The method may comprise detecting S414, by a detector comprising the array of light sensitive areas, an interference pattern formed by interference between scattered object light, being scattered by the sample, and the non-scattered reference light.

The method may be used for imaging an object in the sample that is smaller than a wavelength of the light.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. An imaging device for holographic imaging of a sample, the imaging device comprising:
   a light source configured to generate a light beam;
   a beam splitter configured to receive the light beam and to split the light beam into an object beam along an object beam path in the imaging device and a reference beam along a reference beam path in the imaging device; and
   a detector comprising an array of light sensitive areas, wherein the imaging device defines a sample position, the sample position being configured for receiving the sample,
   wherein the object beam path is arranged in the imaging device such that the object beam is propagated through the sample position, and wherein the detector is arranged in relation to the object beam path so as to prevent non-scattered object light, passing through the sample position without being scattered by the sample, from being incident onto the array of light sensitive areas,
   wherein the reference beam path is arranged in the imaging device such that the reference beam is propagated through the sample position, and wherein the detector is arranged in relation to the reference beam path so that non-scattered reference light, passing through the sample position without being scattered by the sample, is incident onto the array of light sensitive areas,
   wherein the detector is configured to detect an interference pattern formed by interference between scattered object light, being scattered by the sample, and the non-scattered reference light,
   wherein the detector is arranged with respect to the object beam such that a portion of the object beam path passing through the sample position extends in a direction parallel with a plane of the detector onto which the array of light sensitive areas is arranged.

2. The imaging device according to claim 1, wherein the beam splitter is further configured to split the light beam such that a light intensity of the object beam is higher than a light intensity of the reference beam.

3. The imaging device according to claim 2, wherein the beam splitter is further configured to split the light beam such that the ratio of the light intensity of the object beam to the light intensity of the reference beam is greater than 1.

4. The imaging device according to claim 2, wherein the beam splitter is further configured to split the light beam such that the ratio of the light intensity of the object beam to the light intensity of the reference beam is greater than 3.

5. The imaging device according to claim 2, wherein the beam splitter is further configured to split the light beam such that the ratio of the light intensity of the object beam to the light intensity of the reference beam is greater than 10.

6. The imaging device according to claim 2, wherein the beam splitter is further configured to split the light beam such that the ratio of the light intensity of the object beam to the light intensity of the reference beam is greater than 19.

7. The imaging device according to claim 1, further configured such that a cross-section of the object beam, upon being propagated through the sample position, is confined in at least one direction.

8. The imaging device according to claim 7, further configured such that the object beam, upon being propagated through the sample position, is in a shape of a light sheet.

9. The imaging device according to claim 8, further comprising sheet optics arranged in the object beam path, the sheet optics being configured to shape the object beam to a light sheet prior to the object beam being propagated through the sample position.

10. The imaging device according to claim 1, wherein the light source is configured to generate light being at least partly coherent.

11. The imaging device according to claim 1, wherein the light source is a laser.

12. The imaging device according to claim 1, further comprising a receptacle configured to receive a sample holder in which the sample may be placed, and to hold the sample holder such that the sample in the sample holder is located in the sample position.

13. The imaging device according to claim 1, further comprising a flow channel configured for receiving a flow of a fluid in which the sample is contained, the flow channel being arranged such that the flow through the flow channel is passed through the sample position.

14. A method for holographic imaging of a sample located in a sample position, the method comprising:

generating, by a light source, a light beam;

receiving, at a beam splitter, the light beam;

splitting, by the beam splitter, the light beam into an object beam along an object beam path and a reference beam along a reference beam path;

propagating the object beam through the sample position so as to prevent non-scattered object light, passing through the sample position without being scattered by the sample, from being incident onto an array of light sensitive areas;

propagating the reference beam through the sample position so that non-scattered reference light, passing through the sample position without being scattered by the sample, is incident onto the array of light sensitive areas; and detecting, by a detector comprising the array of light sensitive areas, an interference pattern formed by interference between scattered object light, being scattered by the sample, and the non-scattered reference light, wherein the detector is arranged with respect to the object beam such that a portion of the object beam path passing through the sample position extends in a direction parallel with a plane of the detector onto which the array of light sensitive areas is arranged.

15. The method according to claim 14, further comprising:

splitting, by the beam splitter, the light beam such that a light intensity of the object beam is higher than a light intensity of the reference beam.

16. The method according to claim 14, further comprising:

shaping the object beam to a light sheet prior to propagating the object beam through the sample position.

17. The method according to claim 14, wherein the method is used for imaging an object in the sample that is smaller than a wavelength of the light.

\* \* \* \* \*